Jan. 7, 1947. C. ZARKIN 2,413,899
GRAINING MACHINE DUMPER
Filed Oct. 29, 1943 2 Sheets-Sheet 2
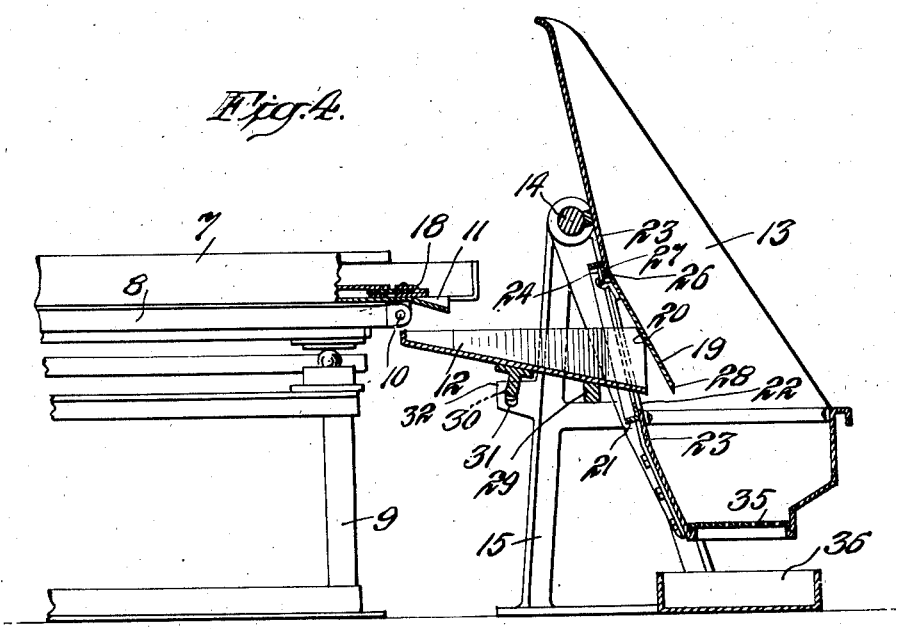
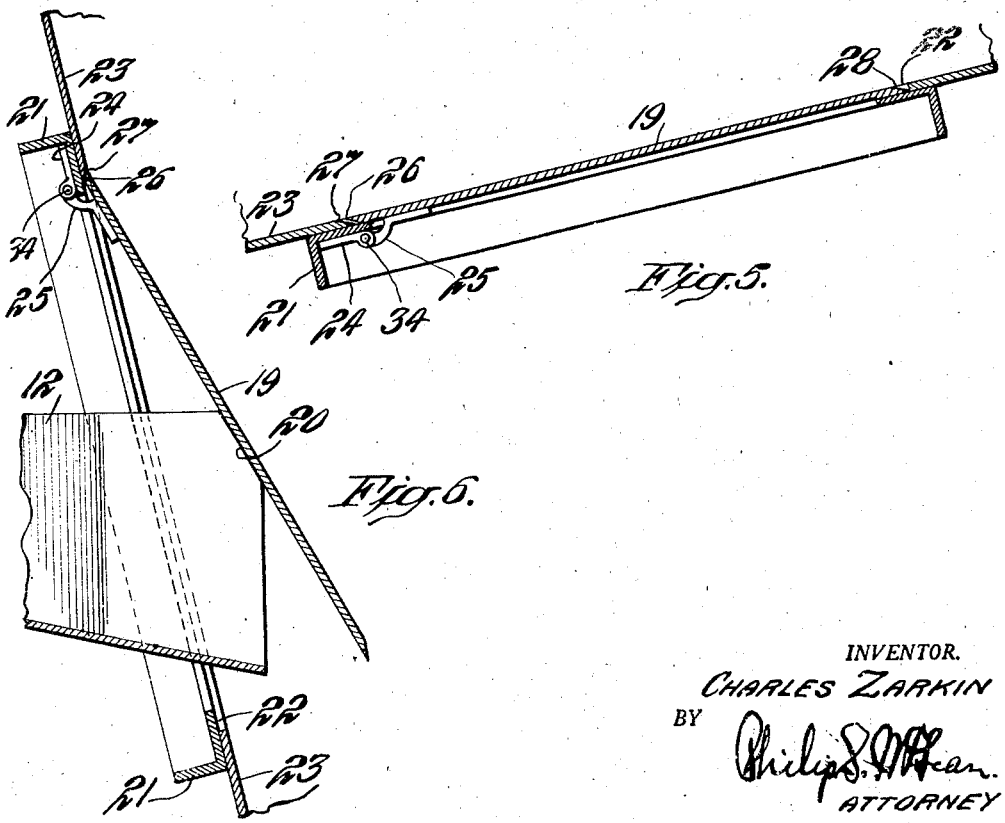
INVENTOR.
CHARLES ZARKIN
BY
ATTORNEY Patented Jan. 7, 1947

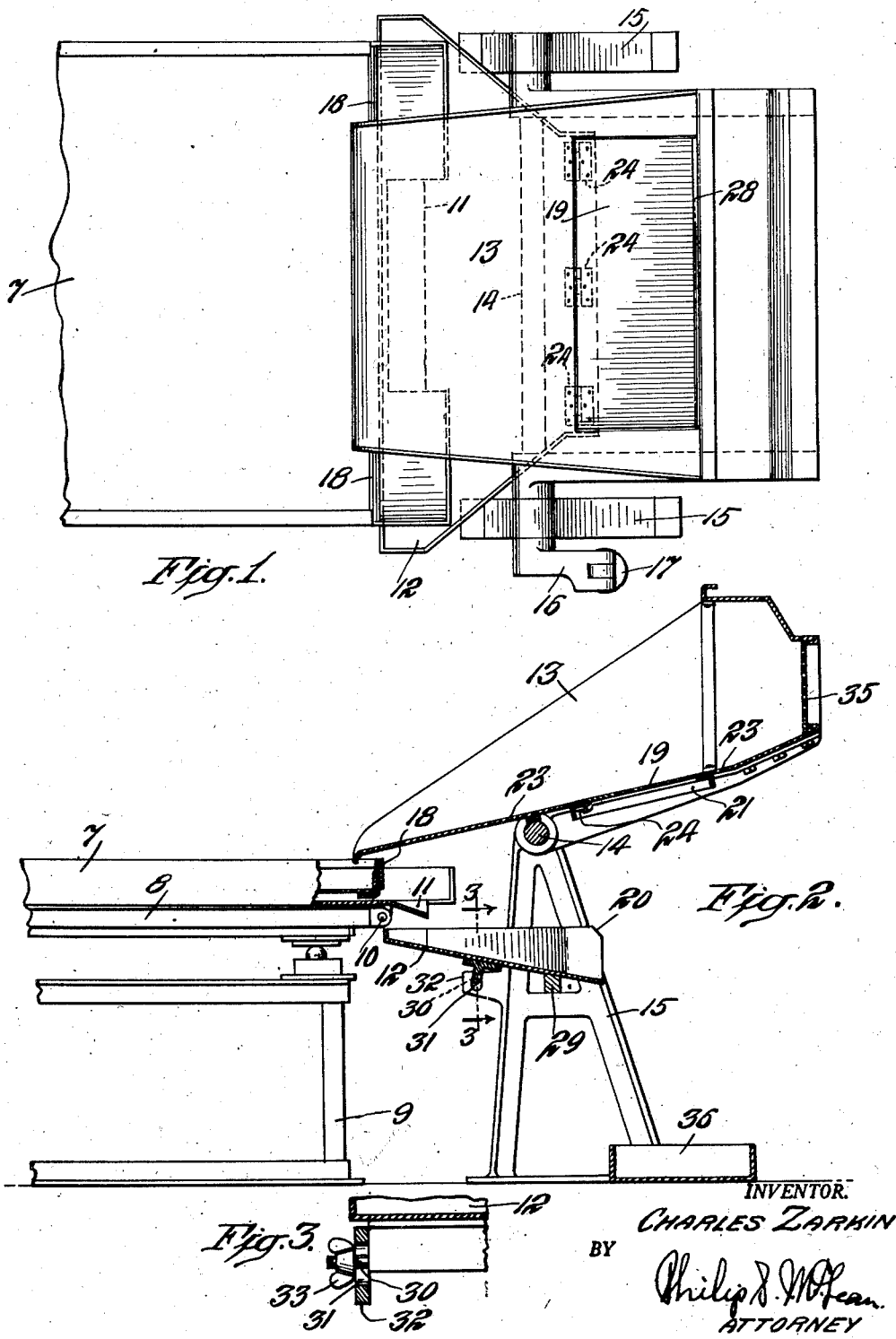

2,413,899

UNITED STATES PATENT OFFICE 2,413,899

GRAINING MACHINE DUMPER

Charles Zarkin, New York, N. Y.

Application October 29, 1943, Serial No. 508,217

1 Claim. (Cl. 51—6)

The invention herein disclosed relates to graining machines of the type disclosed in the Zarkin Patent 2,074,633 of March 23, 1937, and particularly to the dumper mechanism for returning the graining elements to the oscillating tub.

Objects of the invention are to improve the dumper mechanism in structure and operation and in particular, to eliminate any possibility of the marbles, steel balls or other graining elements becoming caught in the trap door of the dumper.

Other desirable objects attained by the invention are hereinafter set forth or will appear in the course of the following specification.

The drawings accompanying and forming part of the specification illustrate a present commercial embodiment of the invention. Structure however may be modified and changed as regards this particular illustration, all within the true intent and broad scope of the invention as hereinafter defined and claimed.

Fig. 1 is a broken plan of the graining tub and dumper mechanism.

Fig. 2 is a broken part sectional side elevation of the same.

Fig. 3 is a broken sectional detail on substantially the plane of line 3—3 of Fig. 2.

Fig. 4 is a view similar to Fig. 2, but showing the dumper lowered from the position first illustrated.

Figs. 5 and 6 are enlarged broken sectional views of the trap door in the two positions shown in Figs. 2 and 4.

In the machine illustrated, the graining tub 7, is carried by a frame 8, mounted for oscillating movement on the base 9, and the tub is pivotally connected with the frame at one end at 10, so that it may be tilted to run off the draining elements through a spout 11, into a convergent inclined tray or trough 12.

The dumper 13, is carried by trunnions 14, journalled in pedestals 15, and is rocked by means of a crank arm 16, on one of the trunnions, connected with the piston 17, of a power cylinder, the latter not shown.

In the raised position, Figs. 1 and 2, the lip of the dumper reaches over the end of the tub to pour the graining elements into the tub in front of the upraised dam 18.

In the lowered position, Figs. 4 and 6, a trap door 19, hinged at its upper end in the bottom of the dumper, is forced open, by engagement over correspondingly inclined rearward corner edges 20, of the chute 12, to thereby admit the lower end of said chute into the lower portion of the dumper, for discharge of graining elements thereinto, when the table is tipped.

The trap door is shown as carried by a rectangular, angle iron frame 21, secured over the back of the bottom, as a frame about and beneath the trap door opening 22, in the bottom wall 23. Hinge brackets 24, are carried by the upper bar of this frame and these carry the forwardly or upwardly offset hinge knuckles 25, connected with the trap door plate 19. The latter as shown in Fig. 5, seats on the angle iron frame 21, within the trap door opening 22.

The upper edge of the door plate is shown as outwardly or upwardly bevelled at 26, to match the inwardly and downwardly bevelled upper edge 27, of the door opening, to fully close any gap between the bottom or floor of the dumper and the door, when the dumper is lowered as in Figs. 4 and 6. This prevents any graining elements or other solid material from getting into the hinge joint as the dumper is lowered and at the same time, leaves the bed of the dumper smooth and flush to run off the graining elements into the tub when the dumper is raised and the trap door is closed as in Fig. 5.

The lower edge of the trap door, at the upper face, is shown as downwardly bevelled at 28, to avoid any abrupt shoulder at this point, which might interfere with or retard flow of the graining elements back into the tub, when the dumper is raised and the door is closed as in Fig. 5.

The return chute 12 is shown as adjustable for purposes of changing its inclination, by being fulcrumed at the outer lower end over the bar 29, and by having lugs 30, toward the upper end of the same engaged in slots 31, in brackets 32, on the pedestals 15, and secured in adjusted relation by wing nuts or other suitable fastenings 33, in Fig. 3.

The angular frame about the trap door opening reinforces the bed of the damper, enabling it to safely carry heavy loads of graining material without warping and the inner portion of this frame, where it extends inwardly beyond this opening, forms a firm solid seat for the trap door, supporting and holding this door in flush relation with surrounding portions of the bottom wall, as will be clear from Fig. 5. This frame also serves as a substantial and rigid mounting and support for the trap door hinge. The hinge leaves 24, may be secured to the frame and hinge leaves 25, be secured to the trap door before these parts are applied to the dumper. Then, after the frame is secured, as by welding or otherwise, in position on the back of the bottom wall, the door may be dropped into position on top of the frame and the hinge pin or pins 34, then passed through the aligned hinge knuckles.

The adjustment of the inclination of the return chute 12 at 30, 31, etc., is also of advantage in locating the chute in best position to receiving the graining elements from the spout 11, of the tub and in disposing the inclined abutment shoulders 20 of the chute in position to open the trap door at the proper time, and to the necessary extent, to rock the upper edge of the door into the hinge protective relation shown in Figs. 4 and 6.

That portion of the dumper which becomes the lower end when the dumper is lowered as in Fig. 4, is shown as having a perforated or reticulated bottom or end wall 35, to drain liquid contents into a catch basin 36.

What is claimed is:

A dumper for a graining machine having a tilting tub, an inclined chute supported independently of the tub in position to receive the graining elements discharged by the tilting of the tub and a dumper pivotally supported independently of the tub in position to receive the graining elements from said chute, when lowered, and to return the graining elements back into the tub when raised, said dumper having a side wall disposed toward the chute and the tub, said side wall having an opening therein registering with and positioned to receive the lower end of the chute when the dumper is in lowered position, a frame secured flat against the outer side of said wall about said opening and extending inwardly beyond the edges of said opening to provide a seat within the perimeter of said opening, a trap door fitting in said opening and resting on said seat substantially flush with the inner surface of said side wall, a hinge carried by said frame on that portion which is uppermost when the dumper is lowered, said hinge being connected with that edge of the trap door which is uppermost when the dumper is lowered, the chute having at the lower end of the same a shoulder projecting through said opening into position to engage and swing the trap door inwardly into the dumper, when the dumper is lowered, and the opposing upper edges of the trap door and the opening in the side wall being angled to cooperatively substantially seal the joint between the trap door and side wall, over the hinge, when said trap door is swung inwardly as described.

CHARLES ZARKIN.